United States Patent [19]

Wankier

[11] 3,908,024

[45] Sept. 23, 1975

[54] DRY BEVERAGE MIX CONTAINING COLOR PLATED SUCROSE PARTICLES AND METHOD OF PREPARATION

[75] Inventor: Bartley N. Wankier, Battle Creek, Mich.

[73] Assignee: General Foods Corporation, White Plains, N.Y.

[22] Filed: July 27, 1973

[21] Appl. No.: 383,352

[52] U.S. Cl. .............. 426/72; 426/74; 426/96; 426/103; 426/177; 426/190; 426/213; 426/217; 426/250; 426/289; 426/293; 426/302; 426/366; 426/380
[51] Int. Cl. ............................................ A23l 1/27
[58] Field of Search ............ 426/72, 96, 98, 103, 74, 426/147, 177, 190, 191, 213, 217, 250, 289, 293, 302, 366, 380; 127/29, 63

[56] References Cited
UNITED STATES PATENTS

| | | | |
|---|---|---|---|
| 2,030,461 | 2/1936 | Moss | 426/213 X |
| 2,332,735 | 10/1943 | Lyons | 426/190 X |
| 2,868,646 | 1/1959 | Schapiro | 426/190 X |
| 3,023,106 | 2/1962 | Common | 426/98 |
| 3,397,063 | 8/1968 | Carlson et al. | 426/177 X |
| 3,658,552 | 4/1972 | Carlson et al. | 426/177 |
| 3,715,216 | 2/1973 | Wuhrmann et al. | 426/190 X |

Primary Examiner—S. Leon Bashore
Assistant Examiner—Arthur L. Corbin
Attorney, Agent, or Firm—Bruno P. Struzzi; Thomas V. Sullivan; Michael J. Quillinan

[57] ABSTRACT

A dry beverage mix, and method for preparation, containing sucrose particles which are color plated by coloring solutes deposited thereon from an aqueous solution and wherein said mix has blended therein tricalcium phosphate particles having coloring solutes plated thereon which coloring solutes are transferred to and adhere on the surface of the colored sucrose particles.

10 Claims, No Drawings

DRY BEVERAGE MIX CONTAINING COLOR PLATED SUCROSE PARTICLES AND METHOD OF PREPARATION

BACKGROUND OF THE INVENTION

Fruit-flavored dry beverage mixes, packaged in viewable containers, enjoy widespread commercial success. Such mixes include natural sweeteners, acidulents and flavors like orange-oil and optionally may have added thereto vitamin and mineral supplements. A particular beverage mix may be edified by the inclusion of a clouding agent to further suggest the flavor intended.

Such mixes must be uniformly blended so that when viewed in a transparent container they provide a color hue that is pleasing and suggestive of the flavor being intended. The sweetener particles, sucrose, of such beverage mixes are desirably colored beforehand by color solutions plated onto the sucrose. Moisture added by such color plating necessitates the presence of tricalcium phosphate to promote flowability in mixing and packaging and curtail lumping and caking of the beverage mix as packaged.

When incorporating the aforesaid edifying functional ingredients either for flavor or nutritional fortification, the amount of mixing and blending can be quite extended. Sucrose particles color-plated with a solution may require in the order of, say, 5 to 10 minutes to achieve the color uniformity intended. During this time the color-plated sucrose particles undergo fracture by reason of particle-to-particle abrasion such that the white crystalline interior of the particles will be exposed; this detracts from the overall color impression intended by lessening color hue. Moreover, as the hue of a given color darkens, particularly, say, for a flavor like grape, the amount of mixing for uniform blendings is protracted; crystal fracture of color-plated sucrose can decrease hue significantly.

It is an object of the present invention to provide a uniformly blended dry beverage mix containing color-plated sweetener particles and offering a hue that provides a stronger color intensity thereby providing an overall improved organoleptic response and esthetic enhancement to the mix.

STATEMENT OF THE INVENTION

In accordance with the present invention, tricalcium phosphate in a finely subdivided form is itself color plated, preferably by adding that amount of water to the phosphate charge needed to put a quantity of coloring dyes in solution and distribute the coloring solution over the fine particles of tricalcium phosphate (TCP), whence the coated particles will be dried. The colored TCP will then be intimately and uniformly blended with a dry mix having color-plated sucrose particles. The procedures whereby coloring solutes are effectively applied in solution to the TCP particles will vary. Spray drying, drum drying or other methods may be employed to effectively maintain the TCP particles dispersed sufficiently to be surrounded by the coloring dye solution, whereafter the coated particles are dried to a stabilizing moisture level substantially less than 0.5%, for mixing with the principal beverage mix ingredients. The mix will consist primarily of a quantity of color-plated sucrose crystals having added thereto powderous acidulents such as citric acid, buffering salts and flavorants such as gum-fixed flavors and/or corn syrup solids fixing flavoring oils of natural origin, i.e. citrus oil. The color-plated sucrose will have a moisture content between 0.2–0.4% and the mix will have an overall moisture content less than 0.5%. The colored TCP will be blended at a level of 0.05 to 5.0% by weight of the mix, the upper limit being that of TCP solubility in a given aqueous quantity for beverage reconstitution; a lower TCP limit of 0.05% of the mix is specified simply because the effects are more pronounced at higher levels.

The sugar constituent is at least partly color plated with coloring solutes, it being within the spirit of the invention to either totally color plate a solution on the sucrose or alternatively to coat a portion of the sucrose and dry plate a coloring dye onto a remaining quantity of the sucrose powder. With continued mixing of the plated TCP and sweetener it has been discovered that the colored TCP particles adhere to the color-plated sugar such that the hue thereof is intensified despite any fracture of the plate sucrose crystals; microscopically the color TCP particles will be seen to coat some of the white exposed surfaces and thereby offset any loss in hue due to fracture during mixing.

By virtue of the present invention, it is now practical to achieve a color intensity greater than that which would otherwise be practical when color plating sucrose per se; and, indeed, it is practical to effectively blend the other minor ingredients uniformly throughout the color-plated sucrose particles while compensating for any loss of hue that may be experienced by attrition milling or other breakage of the particles as mixing proceeds. In some applications, it will be practical to employ the color-plated TCP powder at such a level as not only promotes free flowing characteristics of the mix ingredients but also reduces the required mixing time that may otherwise be desired in order to effect an intended color development or hue in the beverage mix per se.

The particle size of the TCP should be of a size whereat at least 40% passes a number 200 mesh USS Screen, the TCP particle as color plated being of substantially the same density, give or take a very minor percent of original TCP powder density depending upon drying technique employed to fix the color-plating agent thereon.

The greatest practical advantage achieved by this color-plating technique is the ability to develop a darker hue in a given beverage mix than can be obtained by any other technique using a given amount of color. By coloring the TCP itself, its whitish shade or cast is offset and the overall color appearance of the mix may be itensified to at least the hue of the color-plated sugar particle absent fracture and indeed significantly exceeding this hue. By addition of the colored TCP the amount of reflectance from the overall beverage mix, all other things being equal in the given mix vis-a-vis a like mix which does not have colored TCP added thereto, will be significantly reduced thereby intensifying the overall color hue. By virtue of this hue intensification, it is practical to employ mixing techniques to effectively distribute the remaining trace ingredients throughout the beverage powder to an extent which minimizes segregation, provides uniform flavor upon reconstitution and assures an overall beverage character that might not otherwise be achieved without experiencing attrition milling or an overall reduction of color hue.

Other aspects of the present invention are the ability to coblend with color-plated sucrose, hygroscopic diluent fillers such as powderous polysaccharides like corn syrup solids which serve to bulk the mix but which per se will contribute a critical moisture addition which can induce clumping or caking, particularly when this coloring solution plating the sucrose is present in quantities that overreach the ability of TCP per se to function in promoting flowability in such a beverage mix. Hence by color plating the TCP it will be practical to reduce the amount of color-plating solution applied to the sucrose and thus ammeliorate the problems that might otherwise stem from inclusion of such bulking diluents as corn syrup solids or hygroscopic polysaccharidal polymers in the overall beverage mix.

The beverage mix may contain edifying and fortifying additives selected from the class consisting of edible food acids, mineral salts, vitamins, gums, fats and other saccharides and mixtures of these ingredients in combination as illustrated in the following best mode and depicted in the cited U.S. patent therein.

BEST MODE

TCP having a particle size (wet screen method) such that no more than 0.5% is retained on a No. 140 mesh U.S. Series Screen and no less than 99.0% passes a No. 325 mesh screen is selected.

50 lbs. of the finely divided TCP in a solution of 17 gallons water, 238 grams of yellow number 5 color and 152 grams of yellow number 6 color are dispersed in a 50 gallon jacketted vessel equipped with a Lightning Mixer. The dispersion is passed through a two-stage Manton-Gaulin homogenizer, the first stage being set at a homogenization pressure of 1000 PSI and the second stage at 1500 PSI. First stage homogenization effectively assures distributing the particles of TCP powder in a finite dispersion throughout the ultimate coloring solution providing that amount of water needed to place the coloring dyes in solution. The coloring solution is then passed through a spray drying nozzle of conventional design having an orifice opening sufficient to pass the TCP particles and effectively dry the coloring solutes onto the particles, the final TCP particles of about 0.15% moisture being at a particle size distribution whereat 55.6% passes a U.S. 200 Standard Mesh. This coloring solution provides an orange color that uniformly distributes itself about the powderous particles of TCP. The colored TCP will have a moisture content less than 0.50% as an upper limit.

Two percent by weight of this product is then blended with a color-plated sucrose-based beverage mix essentially in accordance with the procedure set forth in U.S. Pat. No. 3,397,063 to Carlson et al. entitled Beverage Mix and Process issued Aug. 13, 1968, the teachings and the exemplary best mode of which is incorporated herein by reference. To illustrate, 2000 lbs of sucrose which has already been wet with the Carlson et al color-plating solution is mixed in a ribbon blender until a uniform color plating of the sucrose is achieved, the plating solution being present at about 0.28%. These "wet" color-plated sugar crystals are blended for approximately 2-3 minutes and the aforesaid dry colored TCP is then added thereto at the stated level of the total beverage charge and mixing is continued for approximately 5 minutes. At this point the color-plated sucrose particles are superficially "dry" and flowable due to the presence of the color-plated TCP. The mix is essentially non-caking and free of any clumping tendencies. Miscellaneous acidulents, buffers, flavors and nutrient supplements are then added. Mixing is continued for a period on the order of 10–15 additional minutes or until such time as there is a uniform blending of the miscellaneous supplementing ingredients providing a uniform character and appearance and uniformity.

The continued mixing of the colored TCP and the color-plated sucrose with the remaining miscellaneous ingredients causes some degree of coloration to be provided to such ingredients as the sucrose. The colored TCP will retain its own coloring but will contribute a hue to the remaining ingredients including those other than sucrose. The overall mix and the individual ingredients thereof will exhibit the particular characterizing color to a greater extent than would be the case if the sucrose were simply wetplated with coloring solution. It appears that there is a definite migration of the coloring solutes from the TCP by an abrasion and rubbing off of these coloring solutes onto the sucrose. Any sugar crystals that are broken will be recolored by the colorants attaching themselves to the crystals at the broken face thereof whereby a background color which is deeper when viewed microscopically is observed.

Although the invention has been described by reference to a specific and preferred operative embodiment, it will be understood that various miscellaneous ingredients can be included other than those specified; the acid's use may range anywhere from the common powderous food acids such as citric, tartaric malic, fumaric, adipic, phosphoric and the like to other acidulents such as hydrochloric. In like manner, the flavorants may be gum-fixed or may be fixed in a corn syrup solids matrix or a flavoring oil such as orange oil, lemon oil, etc. all of which miscellaneous edifying ingredients are well within the skill of this art's calling.

What is claimed is:

1. A dry beverage mix containing sucrose wherein at least a portion of the sucrose is in the form of crystalline particles which are color plated by coloring solutes deposited thereon from an aqueous solution, said mix having a minor amount of finely divided tricalcium phosphate (TCP) particles intimately and discretely blended therewith, said TCP particles having coloring solutes plated thereon by deposition of an aqueous coloring solution and drying said solution prior to blending with said crystalline particles portions of the coloring solutes originally plated on the TCP being transferred to and adhering on the surfaces of the colored crystalline sucrose particles.

2. The mix of claim 1 wherein the majority of the weight percent of the sucrose has a coloring solution applied thereto and wherein the TCP is colored by dispersion thereof in a finely divided form in a coloring solution which is dried onto the surface of the TCP particles.

3. The packaged mix of claim 2 wherein the mix has a total moisture content less than 0.5%.

4. The packaged mix of claim 3 wherein the color-plated sucrose has a moisture content between 0.2–0.4%.

5. The mix of claim 4 wherein the colored TCP is between 0.05 and 5.0% by weight of the mix.

6. The composition of claim 1 wherein the beverage mix contains edifying and fortifying additives selected from the class consisting of edible food acids, mineral salts, vitamins, gums, fats, and other saccharides and mixtures of these agents in combination.

7. The process of preparing an edified beverage mix intended to be viewed and having an enhanced coloration which comprises applying an aqueous solution of coloring solutes onto a finely divided form of tricalcium phosphate (TCP) drying the thusly coated TCP particles to a moisture content less than 0.5%, applying coloring solutes to sucrose particles, blending the dried color-plated TCP and sucrose particles to a free-flowing discrete form of uniform coloration, and causing the coloring solutes originally plated on the TCP to be transferred to and adhere on the surfaces of the sucrose particles by continued intermixing of the ingredients.

8. The process of claim 7 wherein the TCP is colored by applying a coloring solution thereto and drying it so that the TCP particles have a moisture content after drying of less than 0.50%.

9. The process of claim 8 wherein the TCP has a particle size such that 40% passes a No. 200 U.S. screen.

10. The beverage mix of claim 1 wherein the TCP has a particle size such that 40% passes a No. 200 U.S. screen.

* * * * *